Jan. 7, 1969  F. W. SEYBOLD  3,420,116
TRANSMISSION GEARING FOR ELEVATORS
Filed March 1, 1968  Sheet _1_ of 5
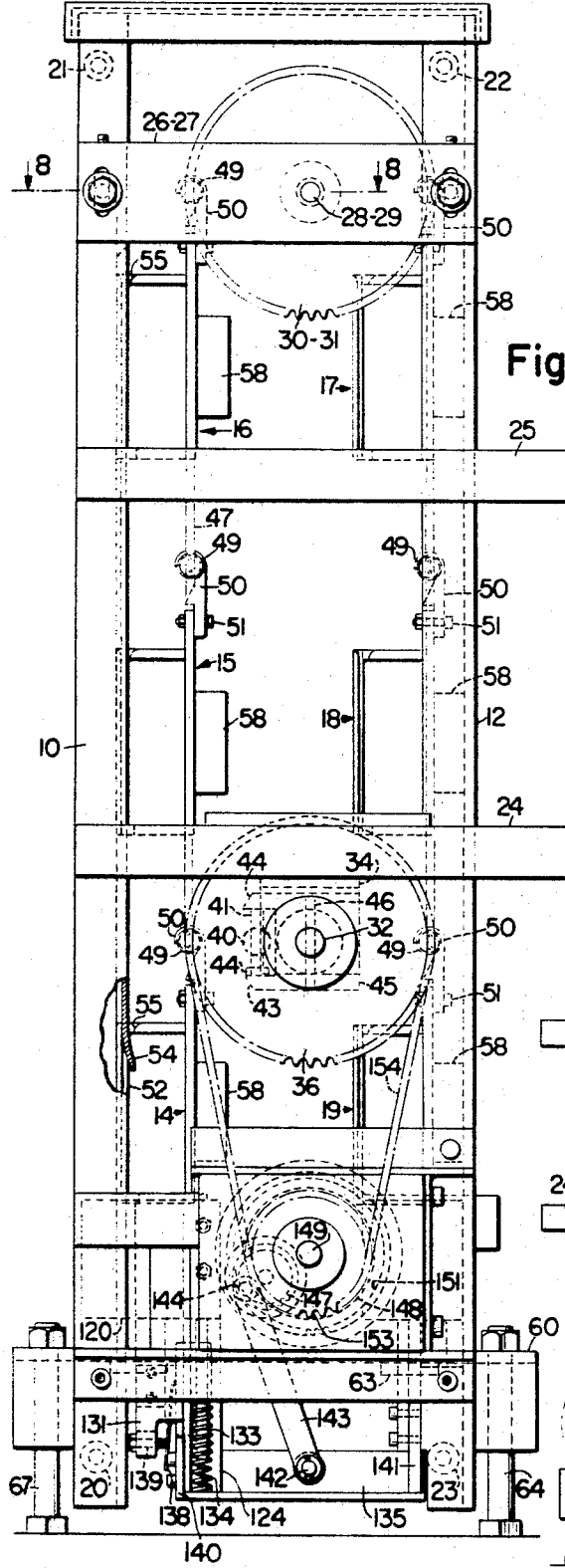
Fig.4
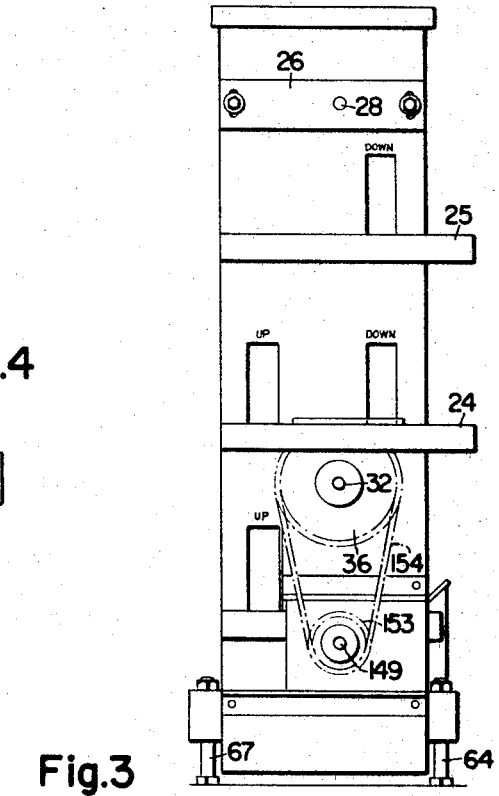
Fig.1
Fig.3
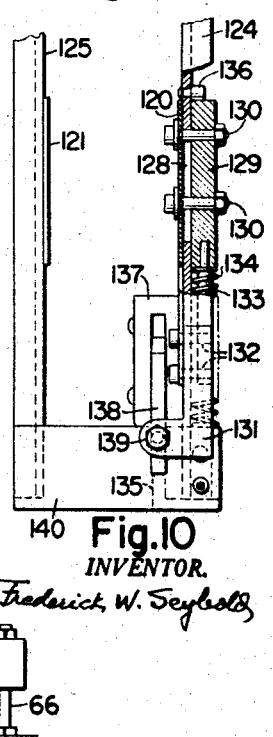
Fig.10
INVENTOR.
Frederick W. Seybold Jan. 7, 1969     F. W. SEYBOLD     3,420,116
TRANSMISSION GEARING FOR ELEVATORS
Filed March 1, 1968     Sheet 2 of 5
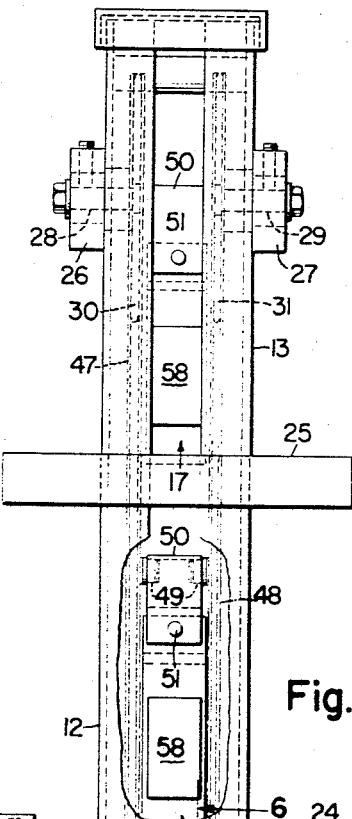
Fig.5
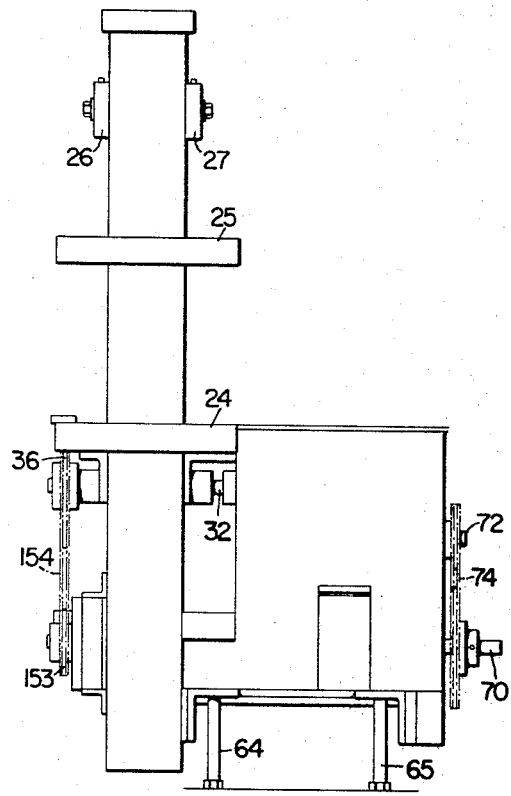
Fig.2
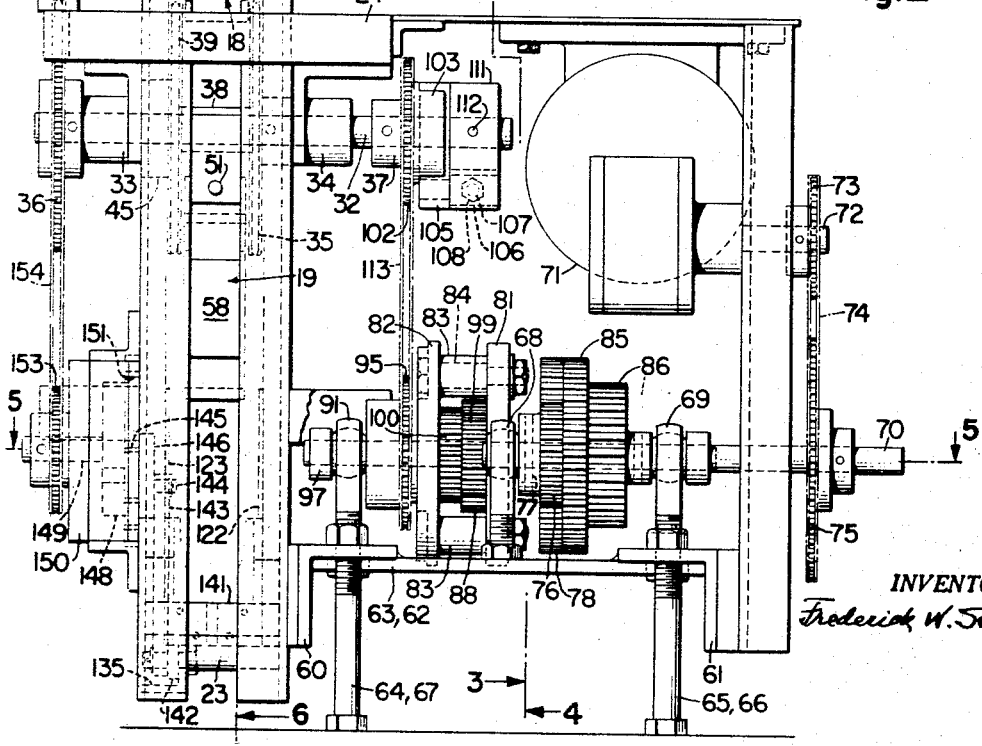
INVENTOR.
Frederick W. Seybold INVENTOR.
Frederick W. Seybold Jan. 7, 1969   F. W. SEYBOLD   3,420,116
TRANSMISSION GEARING FOR ELEVATORS
Filed March 1, 1968   Sheet 4 of 5

INVENTOR.
Frederick W. Seybold

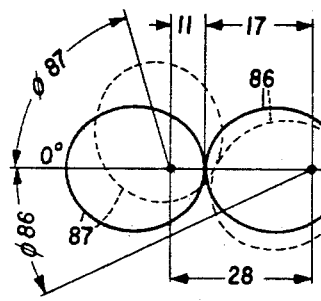

Fig. 17

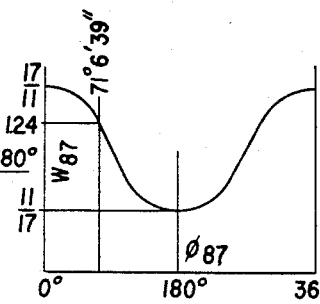

Fig. 18

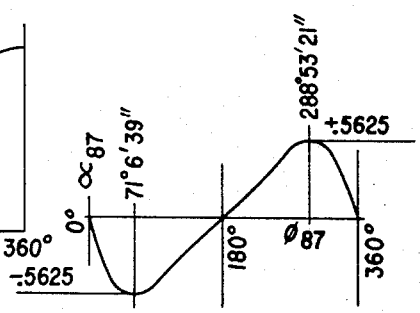

Fig. 19

1. MAXIMUM SPEED RATIO $\dfrac{\text{GEAR } 87}{\text{GEAR } 86} = \dfrac{17}{11} = r$

2. CONSTANT ANGULAR VELOCITY – GEAR 86 = $W_{86}$

3. VARYING ANGULAR VELOCITY – GEAR 87 = $W_{87}$

4. $W_{87} = \dfrac{r^2 + 1 + (r^2 - 1)\cos\phi_{87}}{2r} W_{86}$

5. $= \dfrac{205 + 84 \cos\phi_{87}}{187} W_{86}$

6. $\alpha_{87}$ = ANGULAR ACCELERATION OF GEAR 87, RAD/SEC$^2$

7. $\alpha_{87} = \dfrac{dW_{87}}{dt} = W_{87} \dfrac{dW_{87}}{d\phi_{87}} = W_{87} \times \left[-\dfrac{84}{187}\sin\phi_{87}\right] W_{86}$ $= \left(\dfrac{205 + 84\cos\phi_{87}}{187}\right) \times \left(\dfrac{-84}{187}\sin\phi_{87}\right) W_{86}^2$ $= \left(-.4924 \sin\phi_{87} - .2017 \sin\phi_{87}\cos\phi_{87}\right) W_{86}^2$ 8. $\alpha_{87}$ HAS MAXIMUM VALUE WHEN $\phi_{87} = \begin{array}{l}71°6'59''\\288°53'21''\end{array}$ 9. MAX. $\alpha_{87} = -.5265 W_{86}^2$ 10. MAX. ACCELERATION OF OUTPUT PINION 93 = $\dfrac{34}{23} \times -.5265 W_{86}^2 = -.778 W_{86}^2$ 11. MAX. ACCELERATION OF SPROCKET 102 = $\left(\dfrac{34}{23} \times \dfrac{23}{24}\right) \times -.5265 W_{86}^2 = -.746 W_{86}^2$ 12. WHEN $\phi_{87} = 0°$, $\sin 0° = 0 \rightarrow \alpha_{87} = 0$

Fig. 20

*INVENTOR.*
*Frederick W. Seybold*

United States Patent Office 3,420,116
Patented Jan. 7, 1969

1

3,420,116
TRANSMISSION GEARING FOR ELEVATORS
Frederick W. Seybold, 1979 Dogwood Drive,
Scotch Plains, N.J. 07076
Filed Mar. 1, 1968, Ser. No. 710,450
U.S. Cl. 74—394
Int. Cl. F16h 35/02
6 Claims

ABSTRACT OF THE DISCLOSURE

This invention provides a gear drive mechanism for a continuously operating elevator, which imparts a cyclic, varying rate of speed and a momentary stop to the conveyances of the so-called paternoster lift, which heretofore has operated at a uniform rate of speed and this made the entrance and exit hazardous. The gear drive mechanism herewith disclosed overcomes this drawback by the provision of a momentary stop of the conveyance, whereby a passenger may enter into or leave therefrom with greatly improved safety.

---

This invention pertains to a novel transmission mechanism for imparting a varying linear velocity including a momentary stop of the conveyances or cars of a continuously running elevator, and in which said conveyances move in a circuitous path whereby this cyclic motion may continue uninterruptedly. Continuously running elevators are known to be in use in Europe, mostly in office buildings, but their cars are moving at a uniform speed which requires a passenger to use great caution in boarding or departing therefrom. It is for this reason that continuously running levators have not found favor in the United States.

It is, therefore, a primary object of this invention to provide a transmission mechanism which imparts a varying speed to the conveyances including a momentary stop, said rest period enabling a passenger to enter into or exit from said conveyance with safety.

A further object of this invention is to provide a gearing arrangement wherein "zero" deceleration of the car occurs just before it comes to a momentary stop, and "zero" acceleration of the conveyance occurs immediately after the rest period, thereby adding to the comfort of the passenger.

A still further object of this invention is to provide safety devices in the form of rising guards which close the entrances and exits to the conveyances to prevent anyone from falling into the elevator shaft while the conveyances are in motion.

An additional feature is the provision of means for delaying the operation of the cars in case a passenger is tardy in entering into or departing from the conveyance. The mere pressure of one foot on top of any of said movable guards will prevent it from rising, whereby the driving motor circuit is interrupted, thereby bringing it to a stop.

The provision of an exit opposite the entrance into the conveyance facilitates the transport of more passengers in a given period because an exiting passenger does not interfere with the entering of another passenger on the same floor, otherwise, without a rear exit, the latter would be required to keep the safety guard from rising until he is safely on board.

The cost of operation of such a continuously running elevator compared to a single car installation will be considerably less because the up-going cars will be aided by the down-going cars, thus requiring very little additional power to keep the cars in motion.

The space requirement for a continuously running elevator is also very much less than would be required for

2 an escalator, in addition, a passenger would not be required after ascending or descending a floor to walk to the next stage of the escalator.

Another suitable application of the transmission mechanism would be the conveying of parts or packages from a storage room to the assembly line in a factory where the momentary stop of the conveyor would facilitate such an operation.

In view of the difficulty in illustrating and describing in detail an actual full size elevator, a small model was constructed in which all the essential features of this invention are incorporated, and the advantages compared to existing conveyances will become apparent when reference is made to the following description taken in connection with the accompanying drawings in which:

FIGURE 1 is a front elevation of a 3-floor model elevator having all the working parts enclosed and showing only the floor levels and entrances to the conveyances;

FIGURE 2 is a side view of the model;

FIGURE 3 is a rear view of the elevator showing only the floor levels and the exits from the conveyances;

FIGURE 4 is an enlarged view of FIGURE 1, showing the removal of the enclosures, thereby exposing the general features and arrangement of the conveying mechanism;

FIGURE 5 is a side view of the model showing the arrangement of the driving mechanism in relation to the conveyances;

FIGURE 10 shows the switch mechanism actuated by the safety guards;

FIGURE 17 shows the elliptic gearing with necessary data indicated thereon;

FIGURE 18 shows the variation in the angular velocity of the driven elliptic gear during one cycle;

FIGURE 19 shows the variation in the angular acceleration of the driven elliptic gear during one cycle;

FIGURE 20 shows the method for computing the angular velocity and the angular acceleration of the driven elliptic gear, the maximum angular acceleration of the driving sprocket on the drive shaft of the conveyances.

*General arrangement*

Figure 7:
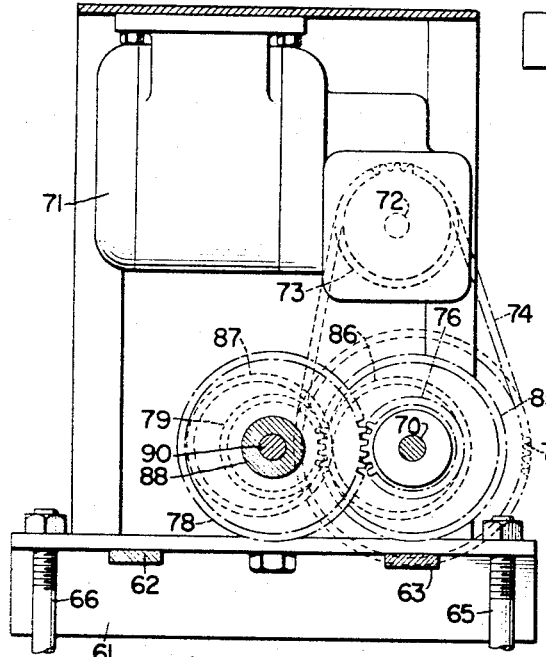
FIGURE 7 is a view taken on line 3—3 of FIGURE 5.
Figure 8:
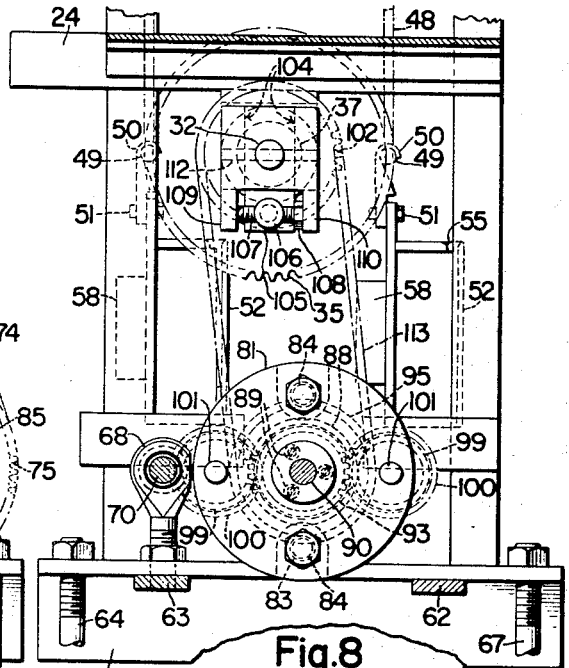
FIGURE 8 is a view taken on line 4—4 of FIGURE 5.
Figure 6:
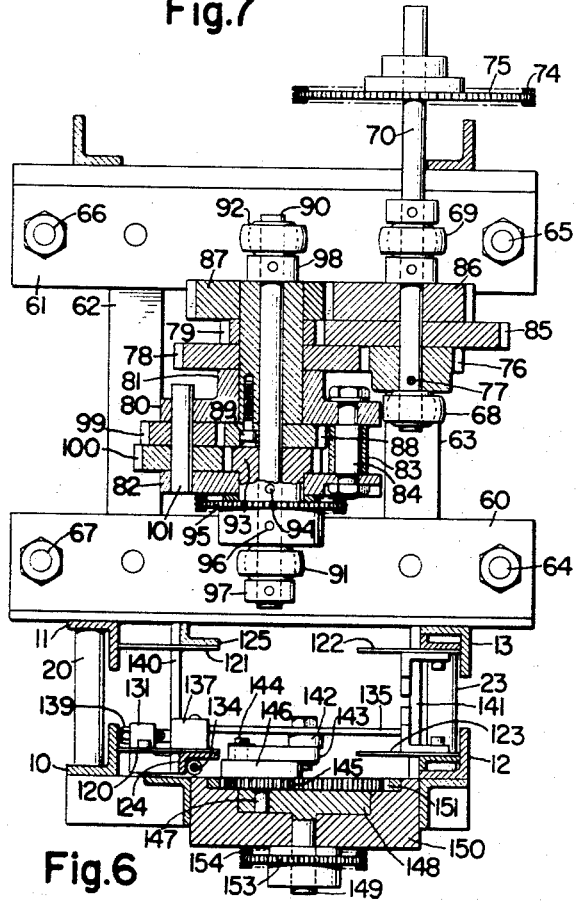
FIGURE 6 is a top view of the driving mechanism taken on line 5—5 of FIGURE 5.

The elevator consists of structural elements or angles, spaced apart in a rectangular arrangement to support shafts and sprockets over which the flexible elements or chains are strung, and suitable platforms to represent the floors of a building. A number of conveyances are suspended from the chains and the spacing between the conveyances on these chains is equal to the distance between floors, so that each cycle advances each conveyance from one floor to the next, up or down.

A varying motion is imparted to the driving sprockets from a novel transmission comprising a reverted planetary gear train, whose input sun element has a varying angular velocity imparted thereto by means of elliptic gears, one of which makes one revolution at uniform speed, while the carrier of the planetary gear set makes two revolutions at uniform speed per cycle. The output sun gear receives a speed which varies from zero to a maximum rate of about ⅘ revolutions per cycle.

In addition, the acceleration of the conveyance at the beginning of a cycle is zero, as well as the deceleration of the conveyance at the end of a cycle is also zero. This feature is of great advantage and results in greatly increased comfort for the passenger.

In order to provide the utmost safety for the passenger vertically moving panels are installed to protect the passenger after the conveyance has been set in motion, these panels will also prevent anyone from falling into the elevator shaft.

In addition when a tardy passenger on leaving the conveyance keeps one foot on the top edge of a panel too long, a slight upward or downward motion of the conveyance will interrupt the driving motor circuit and bring the conveyance to a stop.

Similarly, when a passenger attempts to board or descend from the conveyance prematurely by stepping on the top edge of the panel, it will also cause the elevator to stop.

These vertically movable panels are on long members which are connected to a reciprocating carriage which is actuated by means of a cycloidal crank mechanism, so arranged that the carriage remains at rest during ⅓ of a cycle during which the passenger boards or leaves the conveyance, while ⅓ cycle is used for the upstroke and the remaining ⅓ cycle is used for the downstroke of the carriage.

FIGURES 3 and 4 illustrate the vertical members 10, 11, 12 and 13 comprising the elevator shaft within which the conveyances 14, 15, 16, 17, 18 and 19 move in a vertical path, to be described further in greater detail. Horizontal spacers 20, 21, 22 and 23 connect the respective vertical members and spaced platforms 24 and 25 which represent floors are also interconnected with said vertical members. Crossmembers 26 and 27 are adjustably connected to said vertical members and about midway on said crossmembers are studs 28 and 29 on which large sprockets 30 and 31 are free to turn and are spaced apart to accommodate the conveyances therebetween. A shaft 32 is journalled in brackets 33 and 34 which are secured to platform 24. On this shaft are secured large sprockets 35 and 36 and also a collar 37. Large sprocket 39, which is free to turn on shaft 32, is located in line with the sprocket 30 by the spacer 38.

Figure 9:
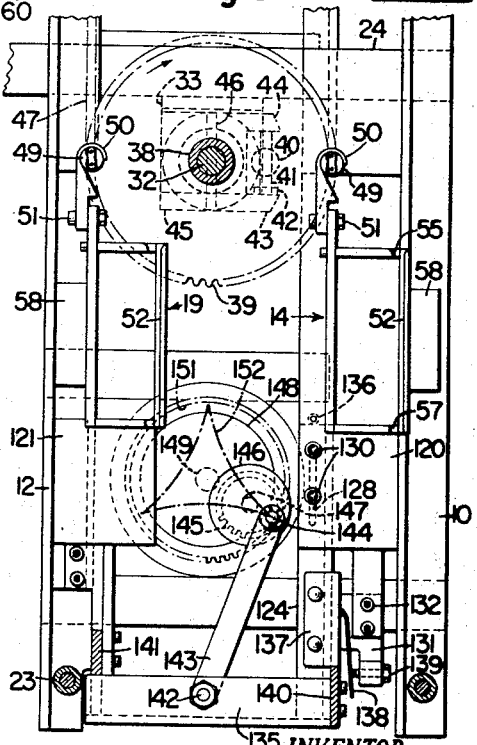
FIGURE 9 is a rear elevation showing the mechanism for actuating the safety guards and is a view taken on line 6—6 of FIGURE 5.

Sprockets 30, 31, 35 and 39 must have a pitch diameter equal to the distance between floors divided by ½ pi. As shown on FIGURE 9, sprocket 39 is provided with a stud 40 which has a threaded member 41 with a hexagon head 42 which is fitted between forks 43 and 44 of the lever 45, the latter being secured to shaft 32 by the pin 46. This adjusting screw 41 permits easy adjustment and alignment of the sprocket teeth of sprockets 35 and 39, so that chains 47 and 48 from which the conveyances are suspended may be brought into line.

Figure 11:
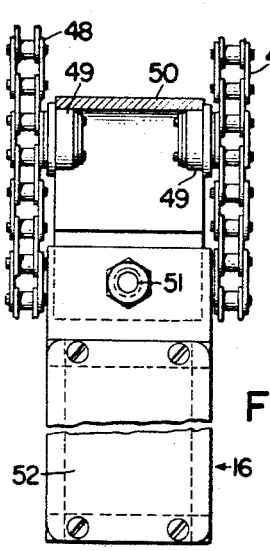
FIGURE 11 is a view showing the method of suspending the conveyance on the flexible elements or chains.
Figure 12:
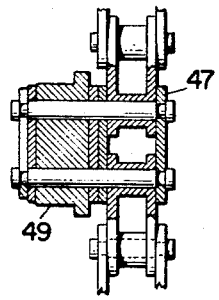
FIGURE 12 is an enlarged view of a chain anchor disc.
Figure 15:
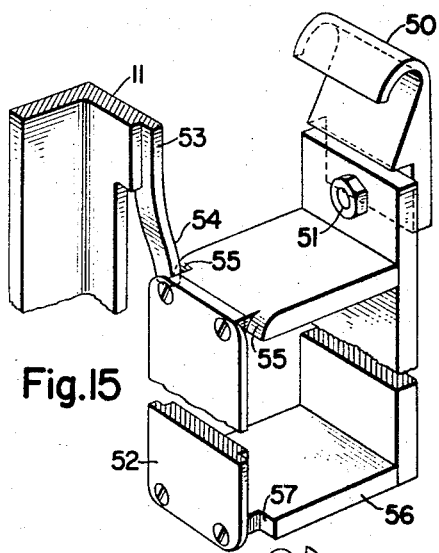
FIGURE 15 is a perspective view of one of the guides which facilitate the entrance of the conveyance into the vertical guides of the frame.
Figure 13:
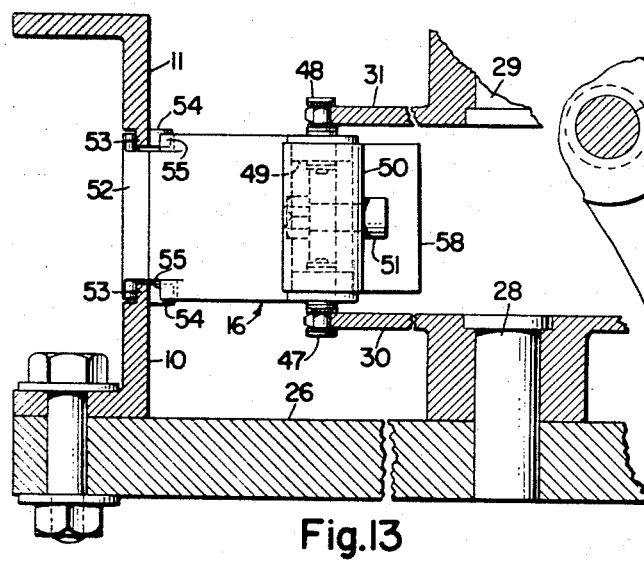
FIGURE 13 shows the conveyance being guided on the L.H. vertical frame members and the mounting of the upper set of sprockets.
Figure 14:
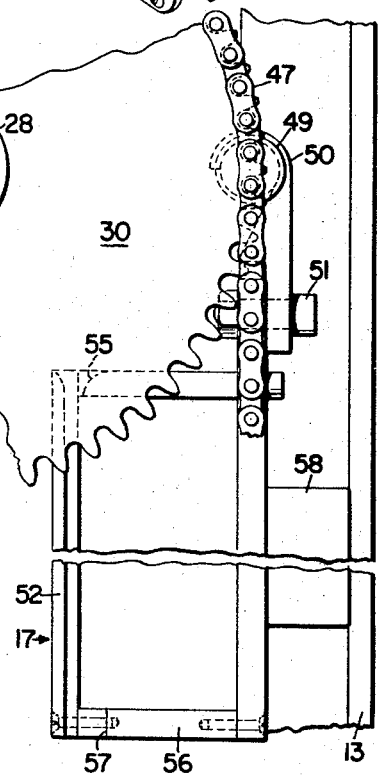
FIGURE 14 shows the conveyance being guided between a set of sprockets and the R.H. vertical frame members.

Chains 47 and 48 are composed of six sections, each section having a length equal to the distance between floors. Each section is connected to the next section by an extended pin connecting link, whereon a circular disc 49 has been fitted on which the hinges 50 as shown on FIGURES 11 and 12 may be hung, the latter being swingingly attached to the conveyances by screws 51, shown on FIGURES 11, 13 and 15. On these figures are shown vertical plates 52 which fit into guides 53 of the vertical members 10 and 11, shown on FIGURE 13. In order to lead a conveyance into guides 53, as it moves along between the lower section of sprockets 35 and 39, curved guides 54 are provided, as shown on FIGURES 4, 13 and 15.

Curved and bevelled recesses 55 are provided on the ceiling of the conveyances to further facilitate the movement into the guides 54. The floor of the conveyances also has cut-backs 57 to accommodate the curved guides 54. The guides 53 terminate a short distance above the floor level when the conveyance has reached the top platform, so that when the disc 49 travels along the upper half of sprockets 30 and 31, the conveyance may easily disengage itself from the guides 53.

A counterweight 58 will maintain the empty conveyance in a vertical position when suspended on the chain, and on its downward motion, weight 58 will be guided along the structural members 12 and 13.

The driving mechanism

The driving mechanism is supported on a framework composed of angles 60 and 61, connected by crossmembers 62 and 63. Support screws 64, 65, 66 and 67 are provided and they are threaded into angles 60 and 61, whereby the entire structure may be maintained in a level condition.

Structural members 11 and 12 are fastened (by screws not shown) to angle 60. Bearings 68 and 69, supported respectively on crossmember 63 and angle 61, are provided for a shaft 70 to which the input power is applied from motor 71, on whose shaft 72 the sprocket 73 is mounted, and then by means of chain 74 to the sprocket 75, which is secured to the shaft 70.

A pinion 76 is secured to shaft 70 by means of pin 77. This pinion meshes with the gear 78, the latter being integral with pinion 79 and the carrier 80, which is composed of a flanged member 81 and a member 82 spaced apart by the sleeve 83 and shoulder stud 84.

The gear ratio between pinion 76 and gear 78 is 2:1, i.e. when shaft 70 makes 4 revolutions, gear 78 and carrier 80 will make 2 revolutions.

Pinion 79 meshes with gear 85 which is integral with the elliptic gear 86, so that when shaft 70 makes 4 revolutions gear 85 will make 1 revolution.

Elliptic gear 86 meshes with elliptic gear 87, the latter, of course, being the same size as the gear 86. Gear 87 has a long hub to which the sun gear 88 is fastened by screws 89, and this long hub is free to turn on a shaft 90 which is journalled in bearings 91 and 92 supported on angles 60 and 61 respectively.

The integral unit composed of gear 78, pinion 79 and carrier 80 is free to rotate on the long hub of the gear 87.

The output sun pinion 93 is secured to the shaft 90 by means of pin 94, as well as sprocket 95 by means of pin 96. Collar 97 and sprocket 95 on opposite sides of bearing 91 will keep shaft 90 in position, and collar 98 will keep elliptic gear 87 in its location.

Integral planetary pinions 99 and 100 are journalled on shaft 101 which is held in the carrier 80 and they respectively mesh with sun pinion 88 and the output sun pinion 93. A sprocket 102 is free to turn on shaft 32 and the hub 103 of sprocket 102 has a slot 104 into which the tongue 105 is fitted. A stud 106 is supported on said tongue and it carries a threaded member 107 with a hexagon head 108 which is fitted between forks 109 and 110 of the driver 111 which is secured to shaft 32 by means of pin 112. Chain 113 connects sprocket 102 to sprocket 95.

The safety mechanism

The safety mechanism comprises a set of sliding panels 120, 121, 122 and 123, a set located at each floor. These panels are guided vertically on long angles 124, 125, 126 and 127 which are provided with a slot 128. An upper slide block 129 is provided with headed studs 130 which engage the slot 128 so that the panels 120, etc. may move freely on the long leg of angle 124, etc. A lower slide block 131 is secured to the lower leg of panel 120 by means of the screws 132 and block 131 bears against the short leg of angle 124.

Slide block 129 is also provided with a guide pin 133 for a compression spring 134 which rests on the crossmember 135 of the reciprocating carriage to be further described, said spring pushing upwardly on the slide block 129. A stop screw 136 prevents the spring from expanding, while exerting an upward force on the panel 120, etc. A limit switch 137 has an actuating lever 138 which may be contacted by the adjusting screw 139 carried by the lower slide block 131.

The reciprocating carriage is located at the lower end of the elevator shaft and it is composed of a C-shaped structure comprising angle 135 and transverse members 140 and 141. Guide angles 124 and 125 are secured to member 140. Cross member 135 is provided with a shoulder stud 142 about midway thereon, on one end of which the connecting rod 143 is fulcrumed. The other end of said connecitng rod is fulcrumed on the crankpin 144 of the planetary pinion 145, comprising a crankdisc 146 and a stub shaft 147 which is journalled in the large driving disc 148, the latter having a reduced extension 149. Disc 148 and its extension 149 are journalled in the stationary housing 150 which is secured to the members 10 and 12.

An internal gear 151 is secured in housing 150 and the teeth of planetary pinion 145 are in mesh with those of the internal gear 151. The crankpin 144 is located on the crankdisc 146 to coincide with the pitch circle of the pinion, and if the ratio of $$\frac{\text{internal gear}}{\text{planet pinion}} = \frac{3}{1}$$

the crankpin 144 will describe a hypo-cycloid of 3 cusps, as shown by curve 152. The length of the connecting rod 143 is made to fit the curve 152, whereby the carriage remains at rest during ⅓ of a cycle.

A sprocket 153 is secured to the extension 149 of the driving disc 148, the former being driven by sprocket 36 by means of chain 154, sprocket 36 being twice the size of sprocket 153.

Figure 16:
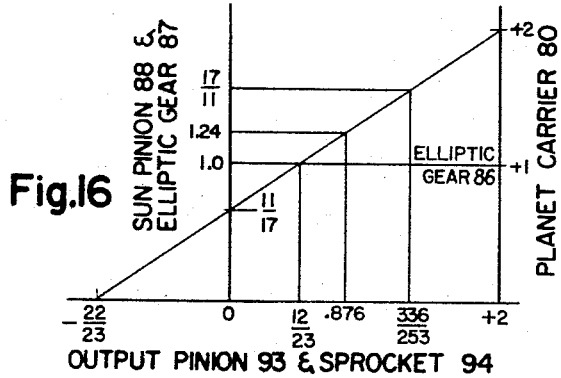
FIGURE 16 is a speed graph of the components of the planetary gearing.

The speed graph shown in FIGURE 16 is constructed as follows:

(1) Draw a horizontal line on which the speed of the output pinion 93 is represented.
(2) Draw 2 perpendicular lines to the above horizontal line and space them a suitable distance apart.
(3) Mark the intersection of the left perpendicular 0 (zero) and that of the right perpendicular +2.
(4) On this left perpendicular the varying speed and direction of rotation of sun pinion 88 and elliptic gear 87 is represented.
(5) On the right perpendicular indicate the constant speed of the planet carrier 80 at +2 and the constant speed of elliptic gear 86 at +1.
(6) On the left perpendicular mark off the minimum speed ratio between the elliptic gears 86 and 87, this value being $11/17$.
(7) Draw a straight line from +2 on the right perpendicular thru $11/17$ on the left perpendicular and note the intersection of this line and compute its location by proportion on the horizontal line to the left of 0, as follows:

$$\frac{11/17}{x} = \frac{2}{2+x}$$

$$x = 22/23$$

When the speed of sun pinion 88 is equal to +1, then by proportion the speed of the output pinion 93 is $+12/23$.

$$\frac{22/23 + y}{1} = \frac{2 + 22/23}{2}$$

$$y = 12/23$$

The maximum speed ratio between the elliptic gears 86 and 87 is the reciprocal of the minimum speed ratio of $11/17$, hence the maximum speed ratio between elliptic gears 86 and 87 is $17/11$.

When the speed of sun pinion 88 is $17/11$, then by proportion the speed of the output sun pinion 93 is $336/253$, or 1.328.

From the speed graph, FIGURE 16, the speed of the output pinion 93 is $-22/23$, when the carrier 80 makes +2 revolutions and when the sun pinion 88 is held stationary.

The following list states the number of teeth for each of the gears comprising the planetary gear set:

Sun pinion 88 has 34 teeth.
Sun pinion 93 has 28 teeth.
Planet pinion 99 has 23 teeth.
Planet pinion 100 has 28 teeth.

| Carrier | Output pinion 93 | | Sun pinion 88 |
|---|---|---|---|
| +2 | +2 | $+\frac{46}{23}$ | +2 |
| Hold | $-2 \times \frac{\text{Sun pinion 88}}{\text{Planet 99}} \times \frac{\text{Planet pinion 100}}{\text{Sun pinion 93}}$ | $-\frac{68}{23}$ | −2 |
| +2 | | $-\frac{22}{23}$ | 0 |

The maximum speed of the output shaft sun pinion 93 from the graph, FIGURE 16, is 1.328 and its minimum speed is zero, its average speed is $12/23$, which it would be also, if the elliptic gears were replaced by two concentric gears of equal size. In other words, for one (1) revolution each of the gears 86 and 87 the output pinion 93 and sprocket 95 will make $12/23$ revolution. However, the sprocket 102 must make ½ revolution per cycle, and since it is driven by chain 113 from sprocket 95, the latter wtih 23 teeth driving sprocket 102, having 24 teeth will produce ½ revolution of shaft 32 per cycle.

The design of the elevator and its unique transmission has been clearly described and illustrated, therefore, it will become obvious to those skilled in the art that various modifications, rearrangements and minor improvements can be made. For example, the large driving sprockets may be replaced by two smaller sprockets which are spaced apart at the upper level and a second set of sprockets at the lower level, thereby forming a rectangular path for the conveyances.

It should be further understood that the gear proportions used in describing the invention are subject to considerable variation to accommodate various operating conditions and such modifications and rearrangements shall come within the scope of the following claims.

I claim:
1. A mechanical drive mechanism which is designed to drive a continuously running elevator having several conveyances suspended from endless chains which are guided over sprockets secured to a shaft to move said conveyances in a circuitous path and to drive said sprock- ets at a varying speed, said mechanical drive mechanism comprising in combination:
  (a) a frame having spaced supports provided with suitable bearings to receive shafts,
  (b) a constant speed drive shaft journalled in two of these bearings and making 4 revolutions per cycle,
  (c) an output shaft journalled in others of these bearings and making less than one revolution per cycle,
  (d) a pinion secured to said constant speed drive shaft,
  (e) a planetary pinion carrier making 2 revolutions per cycle, and mounted co-axially with said output shaft,
  (f) an elliptic gear pair making one revolution per cycle, a first gear having a bore through one focus and a concentric gear secured thereto and free to rotate on said drive shaft,
  (g) a two-element compound gear secured to said carrier, the larger element thereof meshing with the pinion on said drive shaft, the smaller element meshing with the gear on said first gear of said elliptic gear pair,
  (h) a first sun pinion mounted concentrically with the bore through one focus of the second gear of said elliptic gear pair and free to turn on said output shaft, said second gear being provided with a long hub on which said carrier is free to rotate,
  (i) a second sun pinion connected to said output shaft,
  (j) compound planetary pinions mounted on said carrier and meshing with said first and second pinions,
  (k) a drive sprocket connected to said output shaft,
  (l) a driven sprocket mounted on a shaft,
  (m) an endless chain connecting said drive and driven sprockets,
  (n) whereby said combination of gearing and chain drive imparts to the driven sprocket a varying angular velocity.

2. A mechanical drive mechanism to drive a continuously running elevator as set forth in claim 1, whereby said combination of gearing and chain drive produces at the output shaft an acceleration value of zero at the beginning and at the termination of the cyclic motion.

3. A mechanical drive mechanism which is designed to drive a continuously running elevator having several conveyances suspended from endless chains which are guided over sprockets secured to a shaft to move said conveyances in a circuitous path and to drive said sprockets at a varying speed, said mechanical drive mechanism comprising in combination:
  (a) a frame having spaced supports provided with suitable bearings to receive shafts,
  (b) a constant speed drive shaft journalled in two of said bearings and making 4 revolutions per cycle,
  (c) an output shaft journalled in others of said bearings and making less than one revolution per cycle,
  (d) a pinion secured to said constant speed drive shaft,
  (e) a planetary pinion carrier making 2 revolutions per cycle, and mounted co-axially with said output shaft,
  (f) an elliptic gear pair making one revolution per cycle, a first gear of said pair having a bore through one focus and a concentric gear secured thereto and free to rotate on said drive shaft,
  (g) a two-element compound gear secured to said carrier, the larger element being twice the size of the smaller element, said larger element meshing with the pinion on said drive shaft, the smaller element meshing with the gear on said first gear of said elliptic gear pair.
  (h) a first sun pinion mounted concentrically with the bore through one focus of the second gear of said elliptic gear pair and free to turn on said output shaft, said second gear being provided with a long hub on which said carrier is free to rotate,
  (i) a second sun pinion connected to said output shaft,
  (j) compound planetary pinions mounted on said carrier and meshing with said first and second sun pinions,
  (k) a drive sprocket connected to said output shaft,
  (l) a driven sprocket mounted on a shaft,
  (m) an endless chain connecting said drive and driven sprockets,
  (n) whereby said combination of gearing and chain drive imparts to the driven sprocket an angular velocity greater than that of the constant speed of the first gear of said elliptic gear pair and a momentary zero velocity during a cycle.

4. A mechanical drive mechanism which is designed to convert a constant input speed into a varying output speed, said mechanical drive mechanism comprising in combination:
  (a) a frame having spaced supports provided with suitable bearings to receive shafts,
  (b) a constant speed drive shaft journalled in two of these bearings and making 4 revolutions per cycle,
  (c) an output shaft journalled in others of these bearings and making less than one revolution per cycle,
  (d) a pinion secured to said constant speed drive shaft,
  (e) a planetary pinion carrier making 2 revolutions per cycle, and mounted co-axially with said output shaft,
  (f) an elliptic gear pair making one revolution per cycle, a first gear of said pair having a bore through one focus and concentric gear secured thereto and free to rotate on said drive shaft,
  (g) a two-element compound gear secured to said carrier, the larger element thereof meshing with the pinion on said drive shaft, the smaller element meshing with the gear on said first gear of said elliptic gear pair,
  (h) a first sun pinion mounted concentrically with the bore through one focus of the second gear of said elliptic gear pair and free to turn on said output shaft, said second gear being provided with a long hub on which said carrier is free to rotate,
  (i) a second sun pinion connected to said output shaft,
  (j) compound planetary pinions mounted on said carrier and meshing with said first and second sun pinions,
  (k) whereby said combination of gearing drives said output shaft at a greater angular velocity than that of the constant speed of the first gear of said elliptic gear pair.

5. A mechanical drive mechanism which is designed to convert a constant input speed into a varying output speed as set forth in claim 4, whereby said combination of gearing produces at the output shaft an acceleration value of zero at the beginning and at the termination of the cyclic motion.

6. A mechanical drive mechanism which is designed to convert a constant input speed into a varying output speed, said mechanical drive mechanism comprising in combination:
  (a) a frame having spaced supports provided with suitable bearings to receive shafts,
  (b) a constant speed drive shaft journalled in two of said bearings and making 4 revolutions per cycle,
  (c) an output shaft journalled in others of said bearings and making less than one revolution per cycle,
  (d) a pinion secured to said constant speed drive shaft,
  (e) a planetary pinion carrier making two revolutions per cycle, and mounted co-axially with said output shaft,
  (f) an elliptic gear pair making one revolution per cycle, a first gear of said pair having a bore through one focus and a concentric gear secured thereto and free to rotate on said drive shaft, (g) a two-element compound gear secured to said carrier, the larger element meshing with the pinion on said drive shaft, the smaller element meshing with the gear on said first gear of said elliptic gear pair, (h) a first sun pinion mounted concentrically with the bore through one focus of the second gear of said elliptic gear pair and free to turn on said output shaft, said second gear being provided with a long hub on which said carrier is free to rotate, (i) a second sun pinion connected to said output shaft, (j) compound planetary pinions mounted on said carrier and meshing with said first and second sun pinions, (k) whereby said combination of gearing imparts to the output shaft an angular velocity greater than that of the constant speed of the first gear of said elliptic gear pair.

References Cited

UNITED STATES PATENTS

| | | | |
|---|---|---|---|
| 1,973,920 | 9/1934 | Wilson | 187—16 |
| 2,013,817 | 9/1935 | White et al. | 187—16 |
| 2,043,699 | 6/1936 | Geiger | 187—16 |
| 3,127,777 | 4/1964 | Pietsch | 74—394 |
| 3,323,617 | 6/1967 | Inuzuka et al. | 187—16 |

DONLEY J. STOCKING, *Primary Examiner.*

LEONARD H. GERIN, *Assistant Examiner.*

U.S. Cl. X.R.

74—437; 187—16